(12) United States Patent
Weldy

(10) Patent No.: US 6,257,306 B1
(45) Date of Patent: ***Jul. 10, 2001

(54) SNAP/SNAPLESS COVER FOR THE CARGO AREA OF A VEHICLE

(75) Inventor: Ross Weldy, Elkhart, IN (US)

(73) Assignee: Penda Corporation, Portage, WI (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/343,063

(22) Filed: Jun. 29, 1999

(51) Int. Cl.[7] .......................................... E06B 3/80
(52) U.S. Cl. ................ 160/327; 296/100.16; 296/100.18
(58) Field of Search .................................... 160/327, 371, 160/377, 381, 328; 296/100.01, 100.15, 100.16, 100.17, 100.18

(56) References Cited

U.S. PATENT DOCUMENTS

| | | | |
|---|---|---|---|
| 5,058,652 | * | 10/1991 | Wheatley et al. .................. 160/327 |
| 5,487,585 | * | 1/1996 | Wheatley ........................ 296/100.18 |
| 5,522,635 | * | 6/1996 | Downey .......................... 296/100.16 |
| 5,553,652 | * | 9/1996 | Rushford ..................... 296/100.18 X |
| 5,984,400 | * | 11/1999 | Miller et al. ................ 296/100.18 X |
| 6,024,401 | * | 2/2000 | Wheatley et al. .............. 296/100.18 |

* cited by examiner

*Primary Examiner*—Jerry Redman
(74) *Attorney, Agent, or Firm*—Harness, Dickey & Pierce, PLC

(57) ABSTRACT

A tonneau cover assembly is provided including a front rail, a rear rail, and two side rails. The rear rail and two side rails include a pair of opposed lips defining a channel therein. The channel slidably receives a plurality of snap receptacles for cooperating with mating snaps of a tonneau cover having a snap-type mechanism. The channel also receives a hook-type retention member and retains it therein so that a tonneau cover having a hook-type fastening mechanism can be secured thereto. Accordingly, a single rail network can be used with either a snap-type tonneau cover fastening mechanism or a hook-type tonneau cover fastening mechanism.

20 Claims, 2 Drawing Sheets

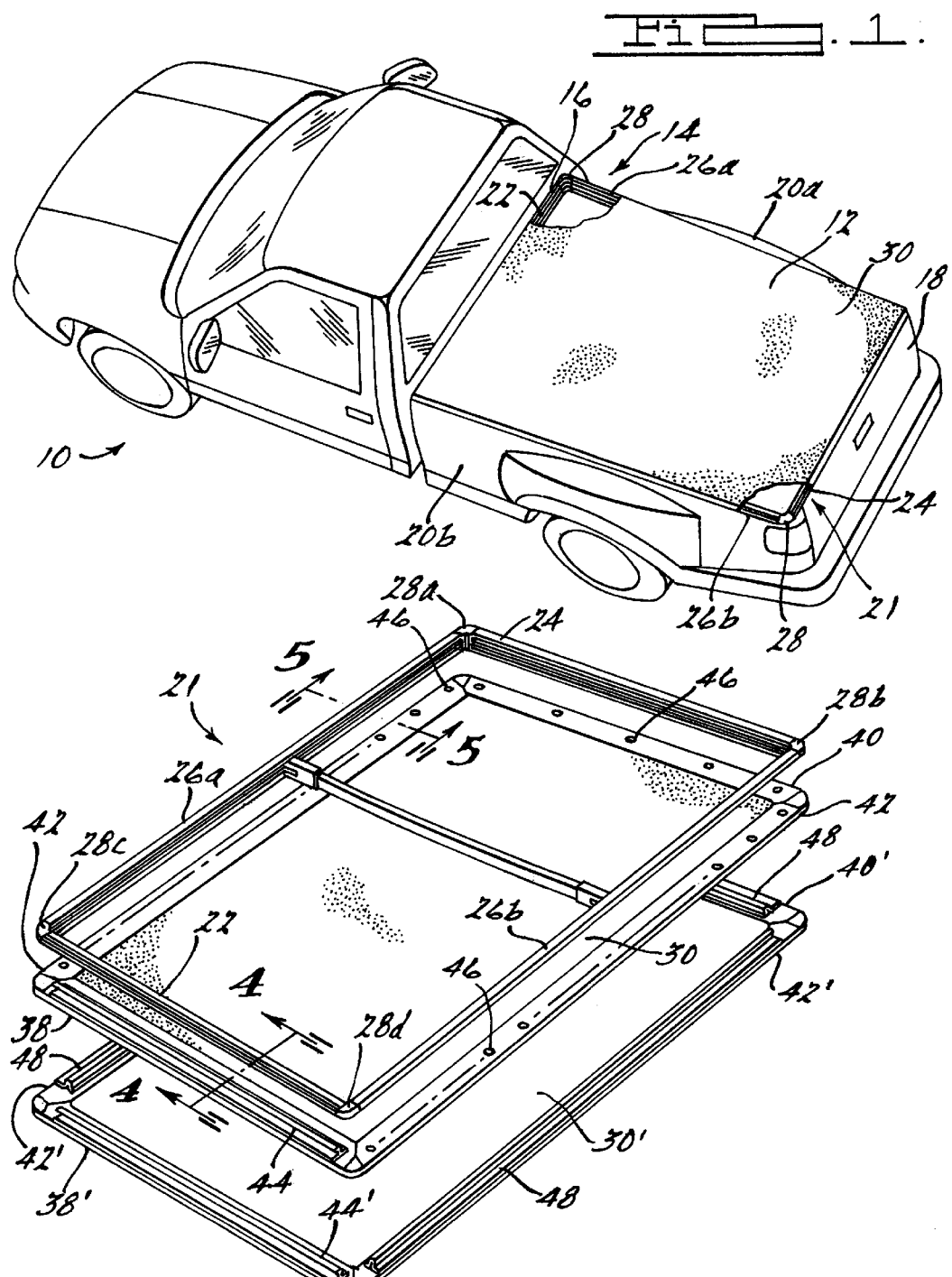

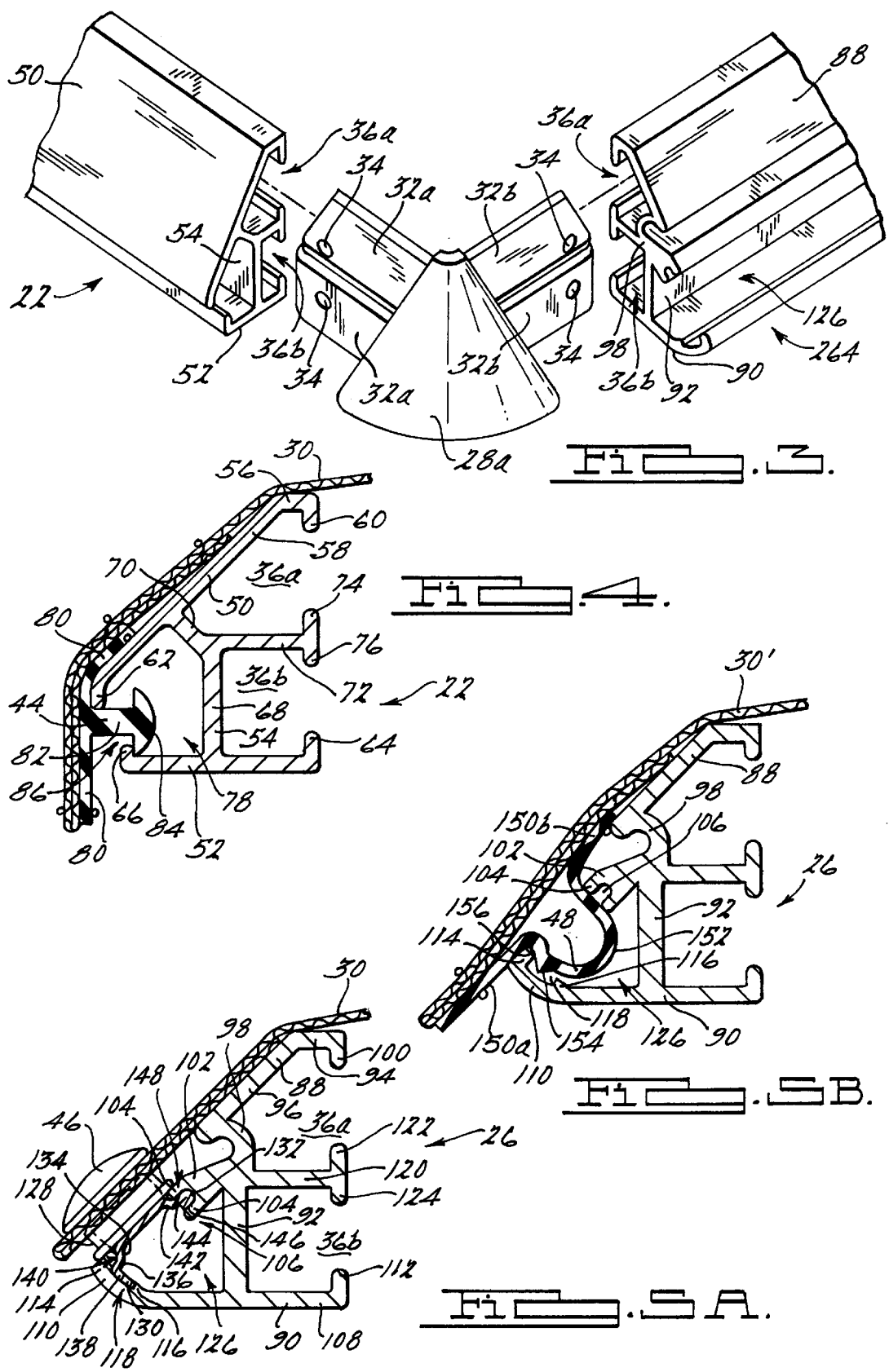

SNAP/SNAPLESS COVER FOR THE CARGO AREA OF A VEHICLE

BACKGROUND OF THE INVENTION

1. Technical Field

The present invention generally relates to tonneau covers for truck beds and, more particularly, to a tonneau cover rail assembly which universally accommodates tonneau covers having snap-type fastening mechanisms and tonneau covers having hook-type fastening mechanisms.

2. Discussion

Tonneau covers are used to cover openings within vehicles. Tonneau covers are commonly used to cover seating sections of boats and convertible cars, as well as pick-up truck beds. Tonneau covers are advantageous since they provide protection from the elements for the contents thereunder and improve aerodynamics.

For years, tonneau covers utilized snap-type fastening mechanisms for securing the cover to the vehicle. In this type of mechanism, several snap receptacles are secured directly to a vehicle. The tonneau cover is provided with mating snaps which are snapped onto the snap receptacles. While adequate, this type of fastening arrangement requires extensive tooling to embed the snap receptacles into the vehicle and, once the snap receptacles are in place, they cannot be easily removed.

Today, most tonneau cover assemblies include a rail network which is attached to the top of the vehicle bed sidewalls. U.S. Pat. No. 4,639,033 to Wheatley et al. and U.S. Pat. No. 4,496,184 to Byrd et al. show tonneau cover assemblies using a rail network. After the rail network is secured to the vehicle, the tonneau cover is secured to the rails.

Rail networks commonly employ one of two types of fastening mechanisms for interconnecting with a tonneau cover. The first type includes a plurality of snap receptacles which cooperate with mating snaps coupled about the perimeter of the cover. The second type employs an elongated slot for cooperating with an elongated hook coupled about the perimeter of the cover. As such, a different rail network is required for use in conjunction with each type of cover. That is, a cover having a snap-type fastening mechanism requires a rail network having mating snap receptacles. Similarly, a cover having hook-type fastening mechanisms requires a rail network having mating channels. As such, a retailer must maintain an inventory of both snap-type and hook-type rail networks for use with each type of cover.

In view of the foregoing, it would be desirable to provide a rail network for a tonneau cover which universally accommodates both snap-type fastening mechanisms and hook-type fastening mechanisms.

SUMMARY OF THE INVENTION

The above and other objects are provided by a tonneau cover assembly including a front rail, a rear rail, and two side rails. Each of the rear and two side rails includes a pair of opposed lips defining a channel therein. The channel slidably receives a plurality of snap receptacles for cooperating with mating snaps of a tonneau cover having a snap-type fastening mechanism. The channel also receives a hook-type retention member and retains it therein so that a tonneau cover having a hook-type fastening mechanism can be secured thereto. Accordingly, a single rail network can be used with either a snap-type tonneau cover fastening mechanism or a hook-type tonneau cover fastening mechanism.

BRIEF DESCRIPTION OF THE DRAWINGS

In order to appreciate the manner in which the advantages and objects of the invention are obtained, a more particular description of the invention will be rendered by reference to specific embodiments thereof which are illustrated in the appended drawings. Understanding that these drawings only depict preferred embodiments of the present invention and are not therefore to be considered limiting in scope, the invention will be described and explained with additional specificity and detail through the use of the accompanying drawings in which:

FIG. 1 is a perspective view of a truck including a tonneau cover assembly coupled thereto according to the present invention;

FIG. 2 is an exploded bottom view of the tonneau cover assembly of FIG. 1 illustrating both interchangeable cover members;

FIG. 3 is an exploded perspective view of a corner assembly of the tonneau cover assembly of FIGS. 1 and 2;

FIG. 4 is a cross-sectional view of the front rail of the tonneau cover assembly of FIG. 2 taken along line 4—4;

FIG. 5A is a cross-sectional view of the side rail of the tonneau cover assembly of FIG. 2 taken along line 5—5 with a cover secured thereto using a snap-type fastening mechanism; and FIG. 5B is a cross-sectional view of the side rail of the tonneau cover assembly of FIG. 2 taken along line 5—5 with a cover secured thereto using a hook-type fastening mechanism.

DETAILED DESCRIPTION OF THE PREFERRED EMBODIMENTS

The present invention is directed towards a tonneau cover assembly for the cargo area of a truck. The tonneau cover assembly includes a plurality of rails adapted to accommodate a cover having either a plurality of snap members coupled thereto or a plurality of hook members coupled thereto. As such, the plurality of rails can be interchangeably used with either style of cover.

Referring now to the drawing figures, FIG. 1 illustrates a vehicle 10 in the form of a truck having a tonneau cover assembly 12 coupled thereto in accordance with the present invention. The vehicle 10 includes a bed 14 defined by a frontwall 16, rearwall 18, and a pair of sidewalls 20A and 20B. The tonneau cover assembly 12 includes a rail network 21 coupled to the frontwall 16, rearwall 18, and sidewalls 20 of the bed 14.

Referring now also to FIG. 2, the rail network 21 includes a front rail 22 coupled to the frontwall 16, a rear rail 24 coupled to the rearwall 18, and a pair of side rails 26A and 26B coupled to the sidewalls 20A and 20B. The side rails 26A, and 26B are connected to the front rail 22 and rear rail 24 by corner members 28. Rail network 21 may be attached to the bed 14 in any number of conventional ways such as by screws, bolts, or clamps. However, to prevent permanent disfiguration of the vehicle 10, it is preferred to use a plurality of clamps (not shown). If desired, padding may be inserted between the rail network 21 and bed 14 to reduce the potential for scratching and to act as a seal.

A cover 30 is coupled to the front rail 22, rear rail 24, and side rails 26 so as to enclose the bed 14. As described in greater detail below, cover 30 may have either a snap-type fastening mechanism or a hook-type fastening mechanism (see cover 30') and still be used with rail network 21. Cover 30 is preferably made of flexible vinyl although any similar weather-resistant flexible material may be used.

As illustrated most clearly in FIG. 2, the first side rail 26A is coupled to the front rail 22 by a first corner member 28A. The second side rail 26B is coupled to the front rail 22 by a second corner member 28B such that the second side rail 26B is opposite the first side rail 26A. The rear rail 24 is coupled to the first side rail 26A by a third corner member 28C and is coupled to the second side rail 26B by a fourth corner member 28D such that it is opposite the front rail 22. The rails are preferably constructed of a sturdy, lightweight material, such as aluminum. The corner members are preferably constructed of a rigid material, such as plastic.

Referring momentarily to FIG. 3, a more detailed view of the connection between the front rail 22 and first side rail 26A is illustrated. This connection is exemplary of each corner connection described above. Corner member 28A includes two pairs of rectangular plugs 32A and 32B laterally extending therefrom. Plugs 32A and 32B preferably form an angle of approximately 90 degrees. Each plug 32A and 32B also contains a threaded bore 34 formed therein.

The generally triangularly shaped front rail 22 and side rail 26A include a pair of slots 36A and 36B extending the entire length thereof slots 36A and 36B have a generally rectangular cross-section and are designed to telescopically receive plugs 32. The front rail 22 is connected to the side rail 26A by positioning corner member 28A therebetween. Plugs 32A are positioned within slots 36A and 36B of the front rail 22 and plugs 32B are positioned in the slots 36A and 36B of the side rail 26A. A threaded fastener (not shown) is then threaded into the threaded bores 34 to fictionally secure the corner member 28A to the front rail 22 and side rail 26A. As such, the front rail 22 and side rail 26A are secured together.

Referring again to FIG. 2, first and second embodiment covers 30 and 30' are illustrated. Cover 30 is preferably rectangularly shaped and includes a front edge 38, rear edge 40, and a pair of side edges 42A and 42B. A T-shaped bead 44 is coupled to the cover 30 proximate the front edge 38. Further, a plurality of snap members 46 are coupled about the perimeter of the cover 30 proximate the rear edge 40 and side edges 42. In contrast, the perimeter of cover 30' includes elongated hook members 48 coupled thereto proximate the rear edge 40 and side edges 42. Conveniently, the rail network 21 accommodates both types of covers 30 and 30'.

Referring now to FIGS. 3 and 4, the front rail 22 will be described in greater detail. The front rail 22 includes a top surface 50 and bottom surface 52 interconnected by an intermediate member 54. The top surface 50 includes a generally horizontal portion 56 and a downwardly angled portion 58. The horizontal portion 56 terminates in a first downturned lip 60 while the angled portion 58 terminates in a second downturned lip 62. The bottom surface 52 is generally horizontal and terminates at a first upturned lip 64 at one end and a second upturned lip 66 at an opposite end. Preferably, the second downturned lip 62 is offset from or overhangs the second upturned lip 66.

The intermediate member 54 includes a generally vertical portion 68 and an outwardly angled portion 70. The intermediate member 54 also includes a horizontal member 72 laterally extending therefrom between the top surface 50 and bottom surface 52. The horizontal member 72 terminates in an upturned lip 74 and a downturned lip 76.

The first downturned lip 60 and upturned lip 74 form a pair of opposed lips defining an opening to slot 36. Similarly, the first upturned lip 64 and downturned lip 76 form an opening into slot 36'. As described above, the slots 36 and 36' retain plugs 32 of corner member 28. The second downturned lip 62 and second upturned lip 66 form a pair of opposed lips defining an opening to a channel 78 bordered by the bottom surface 52, intermediate member 54 and top surface 50.

Referring now primarily to FIG. 4, the T-shaped bead 44 of the covers 30 and 30' is illustrated in greater detail. The T-shaped bead 44 includes a flanged end 80 sewn to the cover 30. A post 82 projects from the flanged end 80 and terminates in a overhanging bead portion 84. The shoulder portion 86 of the bead portion 84 interferes with the second upturned lip 66 while post 82 interferes with the second downturned lip 62 to retain the T-shaped bead 44 in channel 78. As such, the T-shaped bead 44 may be slidably received in channel 78 by first removing a corner member 28, inserting the T-shaped bead 44 into one end of channel 78 and sliding it toward the opposite end, and then replacing the corner member 28, or may be snap-fit in place through a leveraging motion.

Referring now to FIGS. 3 and 5A, the side rail 26A will be described in greater detail. The side rail 26A is exemplary of the configuration of the side rail 26B and rear rail 24. The side rail 26A includes a top surface 88 and a bottom surface 90 interconnected by an intermediate member 92. The top surface 88 includes a horizontal portion 94, a downwardly angled portion 96 and a C-shaped portion 98 (a reverse C as illustrated in FIG. 5A). The horizontal portion 94 terminates in a first downturned lip 100 while the C-shaped portion 98 terminates in a second downturned lip 102. The second downturned lip includes a pair of fingers 104 defining a slot 106 therebetween. Preferably, the second downturned lip 102 is oriented at an angle relative to the horizontal such that it is essentially parallel to the angled portion 96 of the top surface.

The bottom surface 90 includes a horizontal portion 108 and an arcuately angled portion 110. The horizontal portion terminates in a first upturned lip 112 while the angled portion 110 terminates in a second upturned lip 114. The second upturned lip 114 is preferably formed at an angle such that it is parallel to or co-planar with the second downturned lip 102. The bottom surface 90 also includes a projection 116 extending proximate the second upturned lip 114 but spaced apart therefrom so as to define a channel 118.

The intermediate member 92 includes a horizontal member 120 laterally projecting from the intersection of the C-shaped portion 98 of the top surface 88. The horizontal member 120 terminates in a third upturned lip 122 and a third downturned lip 124. The first upturned lip 112 and third downturned lip 124 define an opening to the charnel 36B. Similarly, the first downturned lip 100 and third upturned lip 122 form a pair of opposed lips defining the channel 36A. As described above, the channels 36, 36' retain the plugs 32 of the corner member 28.

The second downturned lip 102 and second upturned lip 114 form a pair of opposed lips defining an opening to a channel 126. A plurality of snap retaining members 128 (only one of which is illustrated) are dimensioned so as to be retained within channel 126. The snap retaining members 128 cooperate with the snap members 46 of the cover 30 to secure the cover 30 to the side rail 26.

The snap retaining members 128 include a snap body 129 coupled to a flange 131 having a first flange end 130 and an oppositely projecting second flange end 132. The first flange 130 includes a first portion 134 laterally projecting away from the body 129 of the snap retaining member 128, a second portion 136 extending essentially orthogonally to the first portion 134, and a third portion 138 extending essentially orthogonally to the second portion 136 so as to be virtually parallel to the first portion 134. The third portion 138 is retained in the channel 118 by engaging the projection 116 and angled portion 110. The first portion 134 and second portion 136 form a shoulder 140 for engaging the second upturned lip 114.

The second flange 132 includes a first portion 142 laterally extending opposite the body 129 of the snap retaining member 128, and a second portion 144 extending essentially orthogonally to the first portion 142 which includes an underturned section 146. The second portion 144 resides within the slot 106 such that the shoulder 148 defined by the first portion 142 and second portion 144 engages the outboard finger 104 of the second downturned lip 102.

The snap retaining members 128 are slidably received within the channel 126 through cooperation of the first flange 130 with the second upturned lip 114 and cooperation of the second flange 132 with the second downturned lip 102. This is preferably accomplished by removing a corner piece 28, sliding a desired number of snap retaining members 128 into channel 126, and then replacing the corner member 128. Removal is accomplished by reversing these steps.

Referring now to FIGS. 3 and 5B, the side rail 26A will be described in conjunction with the alternate embodiment cover 30' including hook members 48. Advantageously, the identical rail network can be used with either the first embodiment cover 30 including snap members 46 or the second embodiment cover 30' with hook members 48. When converted to use with the cover 30', the snap retaining members 128 are removed therefrom or slid to a stored location, e.g., to one end of the slot. Since the side rail 26A of FIG. 5A is identical to that of FIG. 5B, its description will not be repeated here.

The hook member 48 includes a pair of base flanges 150A and 150B sewn to cover 30'. The body 152 of hook member 48 extends from base flanges 150A and 150B and is generally U-shaped. A projection 154 laterally extends from the body 152 proximate the outboard flange 150A. The projection 154 cooperates with the outboard base flange 150A to form a recess 156. In operation, the projection 154 resides within the channel 118 such that the second upturned lip 114 engages the body 152 and base flange 150A along the recess 156. Preferably, the hook member 48 is dimensioned so as to snap fit within the channel 126 by placing the body 152 adjacent the second downturned lip 102 and rotating about this pivot point until the projection 154 snaps beyond the second upturned lip 114.

Thus, the present invention provides universal tonneau cover assembly for the cargo area of a truck. The tonneau cover assembly includes a plurality of rails having a universal channel formed therein for interchangeably accommodating a snap-type fastening system or a hook-type fastening system of a cover. As such, a consumer need only purchase one set of rails for either style of cover.

Those skilled in the art can now appreciate from the foregoing description that the broad teachings of the present invention can be implemented in a variety of forms. Therefore, while this invention has been described in connection with particular examples thereof, the true scope of the invention should not be so limited since other modifications will become apparent to the skilled practitioner upon a study of the drawings, specification, and following claims.

What is claimed is:

1. A tonneau cover assembly comprising:
   a plurality of rails, wherein at least one of said rails includes a universal slot interchangeably retaining at least one of two different types of tonneau cover fasteners therein, one of said tonneau cover fasteners including one half of a snap fastener assembly and a second type of tonneau cover fastener including a bead, said universal slot receives both types of fasteners.

2. The tonneau cover assembly of claim 1 wherein another of said plurality of rails includes a pair of opposed lips defining a channel adapted to slideably receive a bead of a tonneau cover therein, said bead interfering with said pair of opposed lips.

3. The tonneau cover assembly of claim 2 wherein said bead is generally T-shaped.

4. The tonneau cover assembly of claim 1 wherein said at least one rail includes a pair of opposed lips defining said universal slot.

5. The tonneau cover assembly of claim 4 wherein one of said pair of lips includes a pair of fingers defining a generally u-shaped channel adapted to slideably receive an edge of said one half of said snap fastener assembly, and interchangeably abuttingly engage said bead.

6. The tonneau cover assembly of claim 4 wherein said at least one rail includes a projection spaced apart from one of said pair of lips so as to form a generally U-shaped channel between said projection and said one of said pair of lips, said U-shaped channel receiving said one half of said snap fastener assembly therein and orienting said snap fastener assembly relative to said one of said pair of lips by interfering with said projection, said U-shaped channel also interchangeably receiving a projection of said bead therein, said one of said pair of lips retaining said bead in said universal slot.

7. A rail for a tonneau cover assembly comprising:
   a first rail member adapted to engage a substrate;
   a first lip projecting from said first rail member;
   a second rail member opposite said first rail member adapted to engage a cover; and
   a second lip projecting from said second rail member towards said first lip so as to define a universal channel between said first and second rail members, said universal channel interchangeably retaining both one half of a snap fastener assembly and a bead of said cover.

8. The rail of claim 7 wherein said substrate further comprises a wall of a truck bed.

9. The tonneau cover assembly of claim 8 wherein said first lip includes a pair of fingers defining a generally u-shaped channel slideably receiving an edge of said snap fastener assembly and interchangeably abuttingly engaging said bead.

10. The tonneau cover assembly of claim 8 wherein said second rail member includes a projection extending therefrom forming a generally u-shaped channel between said projection and said second lip, said u-shaped channel receiving said snap fastener assembly therein and orienting said snap fastener assembly relative to said second lip by interfering with said projection, said projection also interchangeably orienting said bead relative to said second lip such that said second lip engages a recessed portion of said bead to retain said bead in said universal channel.

11. The rail of claim 7 wherein said first rail member includes a portion angled towards said second rail member and terminating at said first lip.

12. The rail of claim 7 wherein said second rail member includes a C-shaped portion terminating at said second lip.

13. In combination with the rail of claim 7, a cover kit comprising:
   a first cover having said snap fastener assembly disposed along a perimeter thereof; and a second cover including said bead coupled thereto.

14. The rail of claim 7 wherein said snap fastener assembly is slideably retained within said universal channel.

15. A tonneau cover kit comprising:
a plurality of rails;
a first cover having a plurality of first snap assembly halves coupled about a perimeter thereof; and
a second cover having a plurality of beads coupled about a perimeter thereof;
wherein at least one of said plurality of rails includes a universal slot interchangeably retaining both a plurality of second snap assembly halves for engaging said first snap assembly halves, and said beads.

16. The tonneau cover kit of claim 15 wherein said at least one rail further comprises a pair of opposed lips defining said universal slot.

17. The tonneau cover kit of claim 16 wherein one of said pair of lips includes a pair of fingers defining a generally u-shaped channel slideably receiving said second snap assembly halves therein and interchangeably abuttingly engaging said beads.

18. The tonneau cover kit of claim 16 wherein said at least one rail includes a surface proximate one of said pair of lips, said surface having a projection extending therefrom forming a generally u-shaped channel between said projection and said one of said pair of lips, said u-shaped channel receiving said second snap assembly halves therein and orienting said second snap assembly halves relative to said one of said pair of lips by interfering with said projection, said projection also interchangeably engaging a projection of said bead and forcing a recessed portion of said bead over said one of said pair of lips thereby retaining said bead in said universal slot.

19. The tonneau cover kit of claim 16 wherein said at least one rail includes an angled portion terminating at one of said pair of lips.

20. The tonneau cover kit of claim 16 wherein said at least one rail includes a C-shaped portion terminating at one of said pair of lips.

* * * * *